(12) United States Patent
Kringe et al.

(10) Patent No.: US 10,932,411 B2
(45) Date of Patent: Mar. 2, 2021

(54) DROP PAN SYSTEM AND SAMPLE SEPARATOR FOR GRAIN LOSS MEASUREMENT OR OTHER SAMPLE COLLECTION AND ASSESSMENT

(71) Applicant: Marcel Kringe, Brandon (CA)

(72) Inventors: Marcel Kringe, Brandon (CA); Martin Reichelt, Wehr (DE)

(73) Assignee: 7424401 Manitoba Ltd., Brandon (CA)

( * ) Notice: Subject to any disclaimer, the term of this patent is extended or adjusted under 35 U.S.C. 154(b) by 201 days.

(21) Appl. No.: 15/968,197

(22) Filed: May 1, 2018

(65) Prior Publication Data

US 2019/0335659 A1 Nov. 7, 2019

(51) Int. Cl.
| | |
|---|---|
| *A01D 41/127* | (2006.01) |
| *A01F 12/34* | (2006.01) |
| *A01F 12/48* | (2006.01) |
| *A01F 12/44* | (2006.01) |

(52) U.S. Cl.
CPC .......... *A01D 41/1273* (2013.01); *A01F 12/34* (2013.01); *A01F 12/448* (2013.01); *A01F 12/48* (2013.01)

(58) Field of Classification Search
CPC ... A01D 41/1273; A01F 12/34; A01F 12/448; A01F 12/48
See application file for complete search history.

(56) References Cited

U.S. PATENT DOCUMENTS

| 5,951,395 A | 9/1999 | Peter |
| 10,045,487 B1 * | 8/2018 | Robertson ............... A01F 12/24 |
| 2019/0186181 A1 * | 6/2019 | Robertson ............... H01F 7/021 |

FOREIGN PATENT DOCUMENTS

| CA | 963225 | 4/2018 | |
| DE | 10062114 A1 * | 9/2002 | ......... A01D 41/1273 |
| DE | 202015000327 | 2/2015 | |

(Continued)

OTHER PUBLICATIONS

Feiffer Consult, https://feiffer-consult.de, website, downloaded Aug. 5, 2019.

(Continued)

*Primary Examiner* — Alicia Torres
(74) *Attorney, Agent, or Firm* — Thomas J. Oppold; Larkin Hoffman Daly & Lindgren Ltd.

(57) ABSTRACT

A drop pan system for collecting discharge samples from combine harvesters or other conveyed machines or implements features a support housing attachable to the machine, a drop pan receivable in a nested position within the housing, and a magnetic hold/release mechanism with electro-permanent magnets responsive to selective energization to switch from a holding state emitting an external magnetic field for holding the drop pan in the nested position, to a release state cancelling the external magnetic field to thereby release the drop pan from the housing. A power supply is positioned on the housing at an area that resides within a footprint of the drop pan's nested position. Differently sized drop pans may be included, and the housing may include alignment guides for self-aligning the drop pan during magnetically aided placement thereof. Electrical components of the housing may be contained in an enclosure that doubles as a support for the electro-permanent magnets.

26 Claims, 6 Drawing Sheets

(56) References Cited

FOREIGN PATENT DOCUMENTS

| | | |
|---|---|---|
| DE | 202015000509 | 2/2015 |
| DE | 102016201413 | 4/2017 |
| GB | 2387098 | 8/2003 |

OTHER PUBLICATIONS

ScherGain, ScherGain Solution System, https://schergain.ca, website, downloaded Aug. 5, 2019.

* cited by examiner

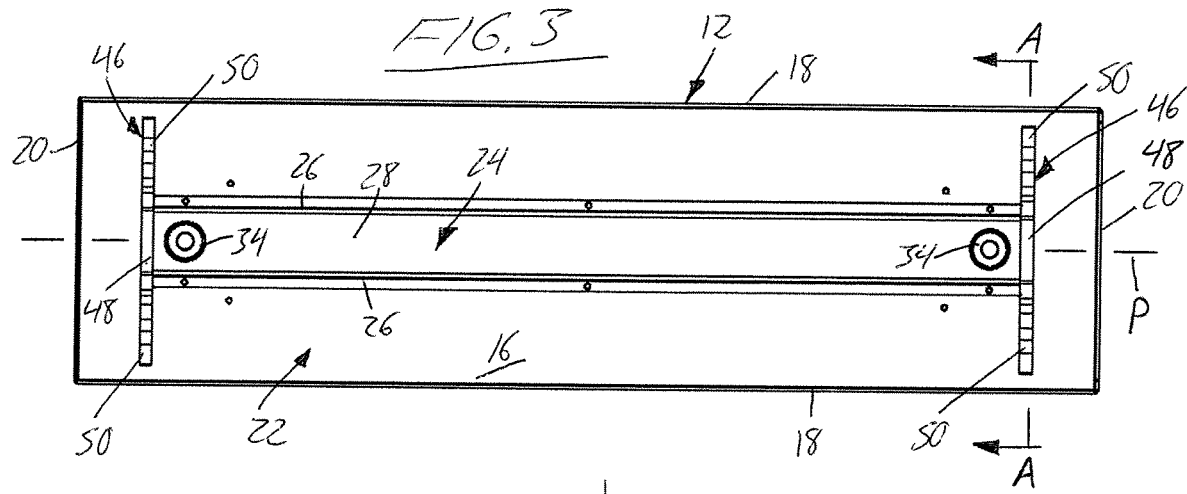
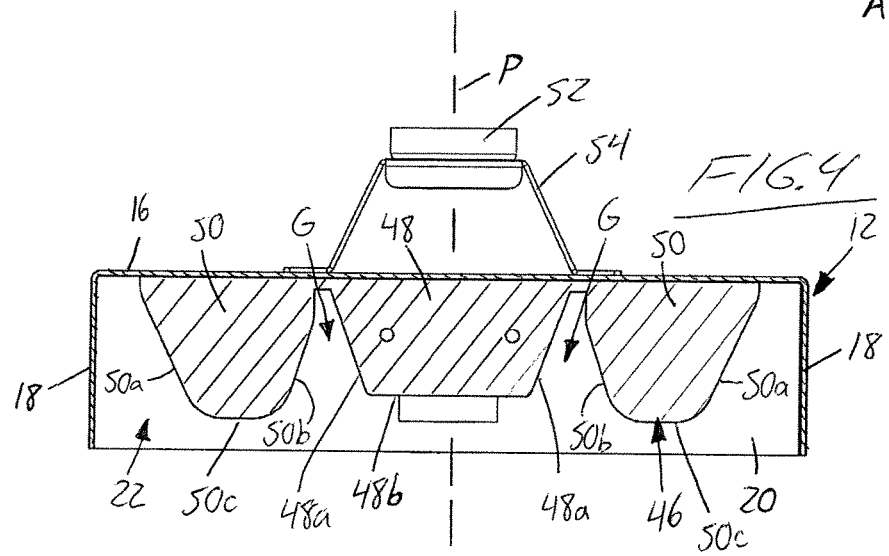
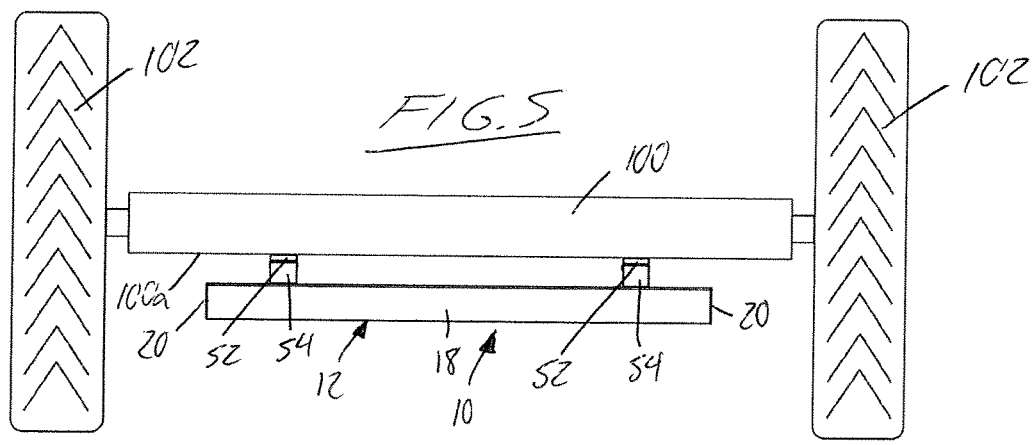

DROP PAN SYSTEM AND SAMPLE SEPARATOR FOR GRAIN LOSS MEASUREMENT OR OTHER SAMPLE COLLECTION AND ASSESSMENT

FIELD OF THE INVENTION

The present invention relates generally to drop pans releasably mounted to the undercarriage of a combine harvester or other conveyed machine or implement for dropping of the pan to the ground to collect a sample of the material discharged from the rear outlet of the machine or implement as its drives forwardly past the dropped pan, and to devices for separating components of the collected sample to assess operational performance of the machine.

BACKGROUND

Drop pans of the above described type have been used for the purpose of evaluating grain losses during operation of the combine harvester. To assess the loss, the drop pan is used to collect a sample of the discharged straw and chaff from the combine harvester, which is then inspected for the presence of grain kernels that were not properly separated from the chaff during processing of the cut crop in within the combine harvester. The quantity of usable grain kernels in the collected sample relative to the sample size is used to gauge the effectiveness of the combine harvester's current performance. If the measured grain loss is beyond an acceptable threshold, adjustment to the operating characteristics of the combine harvester to better suit the current crop conditions can be made to improve performance and reduce losses.

UK Patent Application GB2387098 discloses placement manual placement of a drop pan, thus requiring increased personnel to enable manual drop plan placement relative to a moving combine harvester. This reference also discloses a separator for separating the straw and chaff of the collected sample from the lost grain kernels contained therein. The separator features a cylindrical container with a pervious mesh screen situated below an open upper end of the container, and a fan mounted beneath the mesh screen to blow air upwardly therethrough. The collected sample of the drop pan is poured into the separator, where the airflow blows the chaff and straw through the open end of the container, leaving the grain kernels to settle atop the mesh screen.

U.S. Pat. No. 5,951,395 discloses a drop pan system in which an openable/closeable housing is bolted to the undercarriage of the combine harvester to normally store the drop pan therein, until such time as a release cable operated by the driver of the combine harvester opens the housing to drop the pan to the ground, thus avoiding the need for additional personnel.

Feiffer Consult (http://feiffer-consult.de) offers a drop pan system in which an open-bottomed housing bolted to the undercarriage of the combine harvester has electromagnets that normally hold the drop pan in a nested position inside the housing, until power to the unit is cut off to drop the pan to the ground. The system lacks a dedicated power source, instead having a power cable intended for connection to a cutter bar trolley plug found on some combine harvesters. This conveniently runs the system off the vehicle's existing power supply, but renders the system incompatible with combine harvesters that lack such a plug.

German Utility Model DE202015000327 addresses this problem by instead providing a power supply on the magnetically attached housing, and also provides a wireless handheld transmitter by which the electromagnets are de-energized in order to release the pan.

German Utility Model DE102016201413 omits the use of a separate housing to support the drop pan, and instead mounts a dedicated power supply and electromagnetic components on the drop pan itself to enable direct magnetic attachment thereof to the undercarriage of the combine harvester.

Similar to the latter German reference, a commercially available system marketed under the name ScherGain (http://www.shergain.ca) magnetically mounts its drop pan directly to the combine, rather than via a separate housing.

Despite the forgoing developments in the field of grain loss monitoring, there remains room for improved and alternative designs for grain loss drop pans and sample separators.

SUMMARY OF THE INVENTION

According to a first aspect of the invention, there is provided a drop pan system for collecting a discharge sample from a conveyed machine or implement that discharges material to a ground surface over which the machine or implement travels, said system comprising:

a support housing attachable to the machine or implement;

a drop pan receivable in a nested position at least partially within said housing;

a magnetic hold/release mechanism comprising at least one electro-permanent magnet responsive to selective energization to switch from a holding state emitting an external magnetic field for holding the drop pan in the nested position, to a release state cancelling said external magnetic field to thereby release the drop pan from the housing;

a power supply supported on the housing;

a control circuit between the power supply and the magnetic hold/release mechanism operable to make and break an electrically conductive connection therebetween; and a remote control transmitter communicable with a receiver in the control circuit to effect switching of said control circuit from an open state in which the magnetic hold/release mechanism is de-energized, to a closed state in which the magnetic/hold release mechanism is energized.

According to a second aspect of the invention, there is provided a drop pan system for collecting a discharge sample from a conveyed machine or implement that discharges material to a ground surface over which the machine or implement travels, said system comprising:

a housing attachable to the machine or implement;

a set of differently sized drop pans, each drop pan being selectively receivable in a nested position at least partially within the housing;

a hold/release mechanism operable between a holding state holding the drop pan in the nested position and a release state releasing the drop pan from the housing; and alignment guides for selectively aligning any selected one of said differently sized drop pans relative to the housing and the hold/release mechanism during nested placement of said selected one of said differently sized drop pans in said housing.

According to a third aspect of the invention, there is provided a drop pan system for collecting a discharge sample from a conveyed machine or implement that discharges material to a ground surface over which the machine or implement travels, said system comprising:

a housing attachable to the machine or implement;

a drop pan selectively receivable in a nested position at least partially within the housing;

a magnetic hold/release mechanism operable between a holding state holding the drop pan in the nested position and a release state releasing the drop pan from the housing;

an enclosure that houses one or more electronic components for operating the hold-release mechanism, and that doubles as a support on which magnetic components of the magnetic hold/release mechanism are supported.

According to a fourth aspect of the invention, there is provided a drop pan system for collecting a discharge sample from a conveyed machine or implement that discharges material to a ground surface over which the machine or implement travels, said system comprising:

a drop pan; and a hold/release mechanism operable between a holding state holding the drop pan in a carried position on the machine or implement and a release state releasing the drop pan from the machine or implement;

wherein said drop pan has a width of less than 8-inches.

According to a fifth aspect of the invention, there is provided a drop pan system for collecting a discharge sample from a conveyed machine or implement that discharges material to a ground surface over which the machine or implement travels, said system comprising:

a drop pan; and a hold/release mechanism operable between a holding state holding the drop pan in a carried position on the machine or implement and a release state releasing the drop pan from the machine or implement;

wherein said drop pan has a out-turned wings extending outwardly from perimeter walls thereof.

According to a sixth aspect of the invention, there is provided a drop pan system for collecting a discharge sample from a conveyed machine or implement that discharges material to a ground surface over which the machine or implement travels, said system comprising:

a housing attachable to the machine or implement;

a drop pan selectively receivable in a nested position at least partially within the housing;

a magnetic hold/release mechanism operable between a holding state holding the drop pan in the nested position and a release state releasing the drop pan from the housing;

a power supply supported on the housing for powering the magnetic hold/release mechanism, said power supply being positioned at an area of said housing that resides within a footprint of the drop pan's nested position inside the housing.

According to a seventh aspect of the invention, there is provided a grain loss sample separator for separating grain kernels from straw and chaff in a grain loss sample, said grain sample separator comprising:

a screen atop for receiving said grain sample thereatop; and a variable speed air moving device operable to force air upwardly through said screen to thereby blow away said straw and chaff while leaving said grain kernels to settle atop the screen; and an airflow control mechanism having multiple air speed settings selectable by a user to adjust an airflow speed through said screen according to crop characteristics of said grain loss sample.

BRIEF DESCRIPTION OF THE DRAWINGS

Preferred embodiments of the invention will now be described in conjunction with the accompanying drawings in which:

FIG. 3 is a bottom plan view of a support housing of the drop pan system.

FIG. 4 is a cross-sectional view of the support housing of FIG. 3, as viewed along line A-A thereof.

FIG. 5 is a schematic elevational view illustrating the drop pan system in an installed position on the underside of an axle housing of a combine harvester's undercarriage.

DETAILED DESCRIPTION

Figure 1:
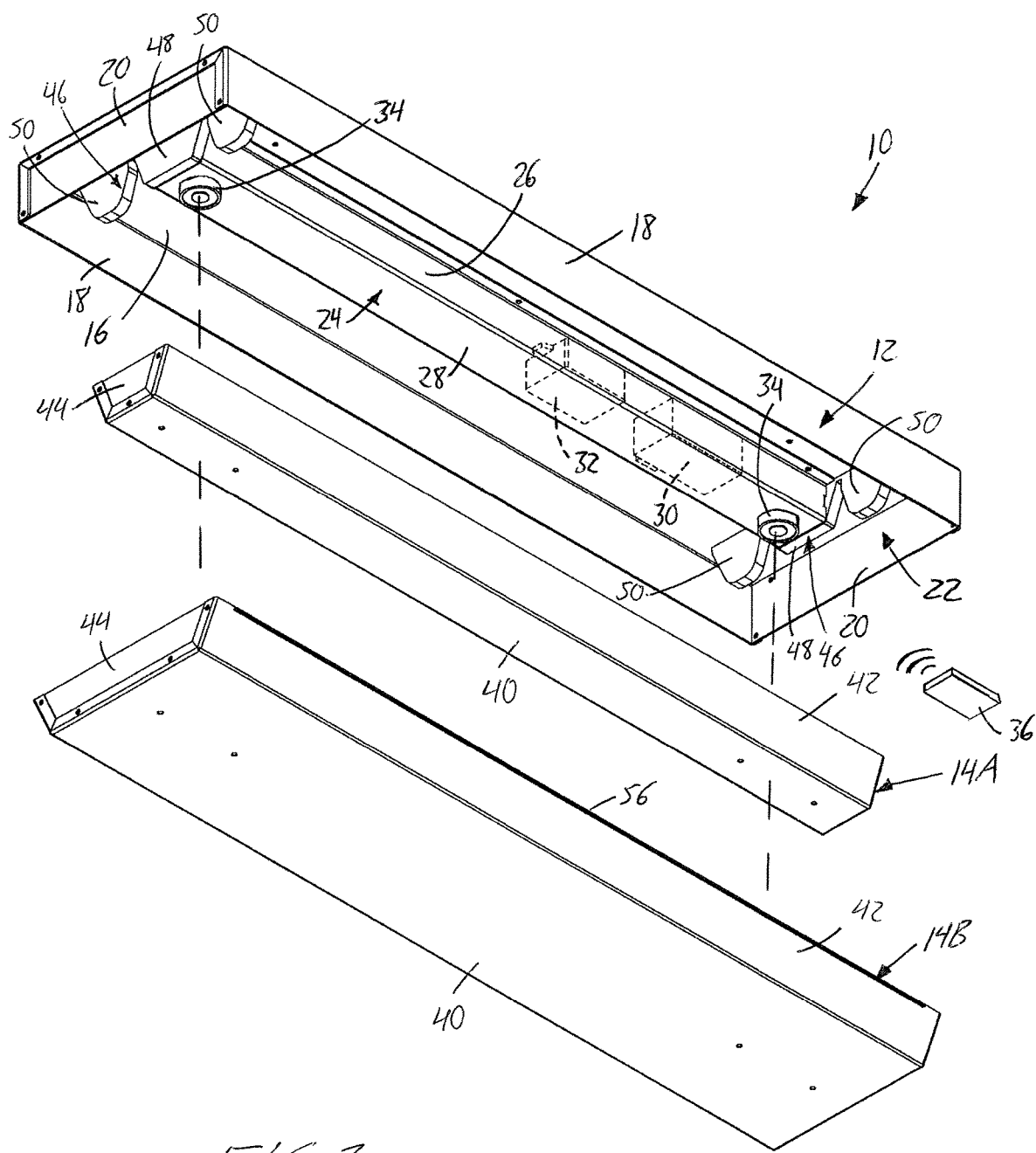
FIG. 1 is an exploded bottom perspective view of a drop pan system of the present invention.
Figure 2:
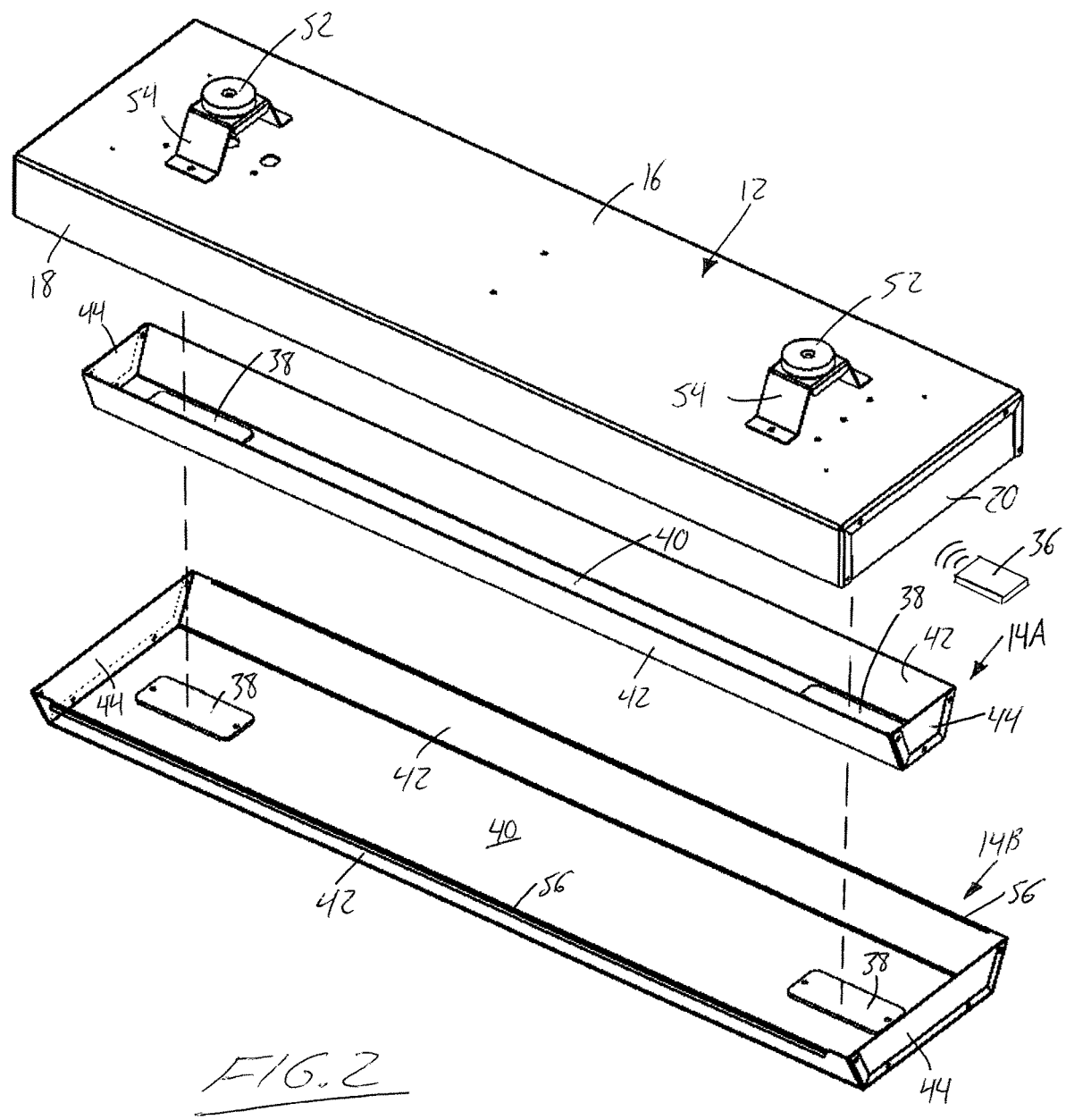
FIG. 2 is an exploded top perspective view of the drop pan system of FIG. 1.

FIGS. 1 and 2 illustrate exploded views of a drop pan system 10 of the present invention, which features a support housing 12 magnetically mountable to the undercarriage of a combine harvester to releasably carry a drop pan thereunder. The illustrated embodiment features two different sized drop pans 14A, 14B each selectively receivable by the support housing 12 to support the selected drop pan beneath the combine harvester. The user can select between the two differently sized pans according to different crop conditions, as described in more detail further below.

The support housing features a rectangular top wall 16, and a set of four peripheral walls depending downward therefrom at respective perimeter edges of the top wall 16. Of these four peripheral walls, front and rear housing walls 18 extend longitudinally of the rectangular top wall, and are longer than left and right housing walls 20 that interconnect the front and rear housing walls at the opposing ends thereof. The housing 12 has an open bottom of rectangular shape delimited by the lower ends of the peripheral walls in a lower plane of the housing that resides oppositely of the top wall 16 in parallel relation thereto. The space bound between the top wall and lower plane within the confines of the peripheral walls denotes an interior space 22 of the housing, which is thus closed off at the top and on all four peripheral sides, but is open at the bottom. The housing thus forms an internally hollow, open-bottomed, rectangular parallelepiped.

The interior space 22 of the support housing 12 features an elongated central enclosure 24 running longitudinally of the housing in parallel relation to the front and rear walls 18 at a longitudinal mid-plane P located centrally therebetween. Walls of this enclosure 24 are defined by a length of square channel attached to the underside of the housing's top wall. Front and rear enclosure walls 26 run parallel to the front and rear housing walls 18 in parallel relation thereto on respective sides of the longitudinal mid-plane P. A bottom enclosure wall 28 spans between the front and rear enclosure walls 26 at lower ends thereof in spaced and parallel relation to both the top wall 16 and lower plane of the housing 12, whereby the bottom wall 28 of the enclosure 24 resides within the interior space 22 of the housing 12 at an intermediate elevation between the top wall 16 and open bottom thereof.

Electronic components of the support housing 12 are contained within the enclosure 24 between the front and rear enclosure walls 26 and between the top housing wall 16 and the bottom enclosure wall 28. These electronic components include a power supply 30 containing or consisting of one or more rechargeable batteries, and a control module 32 comprising a wireless receiver connected to and powered by the power supply 30 within a control circuit. The enclosure 24 not only serves to house these electronic components in a safely enclosed environment, but also doubles as a support for components of a magnetic hold/release mechanism by which the selected drop pan can be normally maintained in a nested position disposed at least partially within the interior space 22 of the support housing 12.

This magnetic hold/release mechanism comprises a pair of electro-permanent magnets 34 protruding downwardly from the bottom enclosure wall 28 toward, but stopping short of, the lower plane occupied by the housing's open bottom. In a known manner, an electro-permanent magnetic is operable to switch between a default holding state exerting an external magnetic field, and a release state lacking said external magnetic field. The default holding state consumes no electrical power, and thus is also referred to herein as a de-energized state of the electro-permanent magnet, while the release state requires application of DC power to an electrical coil of the electro-permanent magnet, and is therefore also referred to herein as an energized state of the electro-permanent magnet. To enable control over the state of the electro-permanent magnets, the control circuit containing the wireless transmitter is also connected to the electrical coil of each electro-permanent magnet, and is configured to switch between an "off" state electrically isolating the power supply from the coils of the electro-permanent magnets, and an "on" state electrically connecting the power supply to the coils electro-permanent magnets. The control circuit is configured to maintain the "off" state by default. In response to a command signal sent to the receiver from the transmitter of a wireless remote control 36, whether operated by the driver of the combine harvester or other personnel in the proximity thereof, the control circuit momentarily switches to the "on" state, thus delivering a momentary pulse of current from the power supply to the coils of the electro-permanent magnets to switch them from the holding state to the release state. After holding the closed state of the circuit for the predetermined pulse length, the circuit automatically returns to the open state, and remains in such state until a subsequent command signal is received.

In order to be magnetically attractable to the electro-permanent magnets, the drop pans 14A, 14B may be made entirely or partially of ferromagnetic material. Another possible construction employs a non-ferromagnetic substance as its constituent material making up the majority of each pan, for example defining a floor and surrounding perimeter walls thereof, while adding smaller ferromagnetic pieces 38 suitably positioned on the pans for alignment with the electro-permanent magnets during nested placement of the selected drop pan into the housing 12. In another example, ferromagnetic steel is used as the constituent material (e.g. aluminum, plastic, composites, etc.) making up the floor and perimeter walls, which are then painted or powder coated, and the smaller ferromagnetic pieces subsequently added to the painted/coated constituent parts are not painted or powder coated with the same material or thickness of paint or other coating t, which may detriment their magnetic attractiveness, though other chemical treatments or coatings of different material composition or thickness may used to still provide corrosion protection while being of less magnetic detriment. In the illustrated embodiment, each ferromagnetic piece 38 is a flat steel plate fastened to a topside of the pan's bottom floor 40.

In the illustrated embodiment, the bottom floor 40 of each pan is of elongated rectangular shape slightly shorter and narrower than the top wall 16 and open bottom of the housing 12, and the perimeter walls of each pan thus include longitudinally oriented front and rear pan walls 42 of greater length than shorter left and right pan walls 44 that interconnect the front and rear pan walls at opposite ends thereof. The front and rear pan walls are outwardly sloped to diverge upwardly away from the bottom floor of the pan. The left and right pan walls are trapezoidally shaped to fully close off the ends of the pan between the sloped front and rear walls thereof. Each pan has a rectangular open top delimited between the front, rear, left and right pan walls at the top ends thereof in an upper plane of the pan situated oppositely of and parallel to the bottom floor 40. The open top of each pan is slightly shorter and narrower than the top wall 16 and open bottom of the housing 12, whereby the pan, or least the open top thereof, is insertable upwardly into the housing 12 through the open bottom thereof for nested receipt of the pan at least partially within the interior space of the housing. Preferably the height of each pan is less than that of the housing to enable full receipt of the entire pan within the interior space 22 of the housing 12 so that the bottom floor 40 of the pan resides within or slightly above the lower plane of the housing 12 in the pans fully nested position therein.

The interior space 22 of the housing 12 features identical left and right guide brackets 46 situated respectively adjacent the left and right housing walls 18 in parallel relation thereto at short distances inward therefrom. Each guide bracket 46 in the illustrated embodiment is a flat plate lying parallel to its adjacent one of the left and right housing walls. A flat top edge of each guide bracket 46 is affixed to the underside of the housing's top wall 16, while the bracket's bottom edge follows a non-linear path giving the bracket a variable-height profile from one end of the bracket to the other. Each bracket 46 is symmetric across the longitudinal mid-plane P, and the variable-height profile divides each bracket 46 into three distinguishable lobes, namely a center lobe 48 situated on and bisected by the mid-plane P, and two outer lobes 50 situated on opposite sides of the center lobe in symmetric relation to one another across the mid-plane P.

The center lobe 48 is trapezoidal in shape, being delimited by convergently sloped edges 48a that converge downwardly toward the mid-plane P from opposite sides thereof, and are joined together across said mid-plane by a flat central edge 48b lying parallel to the top wall 16 of the housing. The angle of convergence between these sloped edges 48a of the bracket's central lobe matches the angle at which the sloped front and rear walls of the smaller drop pan 14A converge downwardly toward the floor of the drop pan 14A.

Each outer lobe 50 is delimited between an inwardly sloped outer edge 50a that slopes downwardly toward the mid-plane P from near the front or rear housing wall 18, an opposing inner edge 50b facing the nearest sloped edge 48a of the central lobe across a gap G left therebetween, and a bottom edge 50c joining together the inner and outer edge of the outer lobe in generally parallel relation to the top wall 16 of the housing 12. The sloped outer edges 50a of the two outer lobes thus converge downwardly and symmetrically toward the mid-plane. The angle of convergence between these outer edges 50a matches the angle at which the sloped front and rear walls of the larger drop pan 14B converge downwardly toward the floor of the drop pan 14B. The distance between these outer edges 50a where they meet the bottom edges 50c of the outer lobes closely matches the bottom width of the larger drop pan 14B, as measured across the floor of the larger drop pan 14B between the bottom ends of the front and rear pan walls thereof. Likewise, the distance between the outer edges 50a of the outer guide bracket lobes near the top wall 16 of the housing 12 closely matches the top width of the larger drop pan 14B, as measured across the open top of the larger drop pan 14B between the top ends of the front and rear pan walls thereof. The bottom edges 50c of the outer lobes lie in or slightly above the same plane as the bottom ends of the electro-permanent magnets 34.

The trapezoidal center lobes 48 of the two guide brackets 46 cap off the two longitudinally opposing ends of the enclosure 24 in which the housing's electronic components are housed. The electro-permanent magnets 34 are mounted to the bottom enclosure wall 28 and are centered on the mid-plane P at positions respectively near the two guide brackets 46 at the ends of the enclosure 24.

Since the downwardly converging trapezoidal shape shared by the center lobes 48 of the two brackets 46 is centered on the same mid-plane P in which the electro-permanent magnets 34 are mounted, and the taper or convergence angle of these center lobes 48 matches that of the smaller drop pan 14A, the sloped edges 48a of the central lobe form guide surfaces for centering the bottom wall of the smaller drop pan on the mid-plane of the housing to thereby align the floor of the smaller drop pan 14A with the electro-permanent magnets 34. Manually lifting the smaller drop pan upwardly into the open bottom of the support housing 34 brings the ferromagnetic pieces 38 on the floor 40 of the pan 14A into proximity with the electro-permanent magnets 34. Accordingly, as long as the drop pan 14A is generally centered enough so that its open top end encompasses the bottom edge 48b of the guide bracket center lobes, the drop pan 14A will self-center itself on the mid-plane P as the external magnetic field exerted by the default holding state of the electro-permanent magnets 34 lifts the ferromagnetic pieces 38 on the pan floor 40 upwardly into contact with the bottom ends of the electro-permanent magnets 34. The center lobes 48 of the two guide brackets 46 thus define an inner set of alignment guides for guided self-alignment of the smaller drop pan 14A during magnetically aided lifting of the drop pan into a nested position inside the support housing 12, during which the gaps G between the center lobe 48 of each bracket and the outer lobes 50 thereof accommodate the front and rear pan walls 42 of the smaller pan 14A.

Similarly, since the downward convergence of the outer edges 50a of the outer lobes 50 of each bracket is centered on the same mid-plane P in which the electro-permanent magnets 34 are mounted, and matches the taper or convergence angle between the front and rear walls 42 of the larger drop pan 14B, the outer edges 50a of the outer lobes 50 of the two brackets 46 form guide surfaces for centering the bottom wall 40 of the larger drop pan 14B on the mid-plane P of the support housing 12 to thereby align the floor 40 of the larger drop pan 14B with the electro-permanent magnets 34. Manually lifting the larger drop pan upwardly into the open bottom of the support housing 12 brings the ferromagnetic pieces 38 on the floor 40 of the pan into proximity with the electro-permanent magnets 34, and as long as the drop pan is generally centered enough that its open top end encompasses the bottom edges 50c of the outer guide bracket lobes 50, the drop pan will self-center itself on the midplane P as the magnetic field exerted by the default holding state of electro-permanent magnets 34 lifts the ferromagnetic pieces 38 on the pan floor 40 upwardly into contact with the bottom ends of the electro-permanent magnets 34. The outer lobes 50 of the two guide brackets 46 thus define an outer set of alignment guides for self-alignment of the larger drop pan 14B during magnetically aided lifting thereof into the nested position inside the support housing 12.

While the inner and outer alignment guides near each end of the housing are integrally seamless parts of a singular unitary bracket in the illustrated embodiment, where the gaps G open upwardly into the bracket but stop short of the mounted upper edge thereof where intact upper portions of the bracket join the different lobes together, it will be appreciated that discrete and separate lobes individually defined by respective individual pieces may be employed instead of integrally connected lobes of a common bracket. The smaller drop pan, having a lesser with than the larger drop pan, is better suited than the larger drop pan for use in long stubble conditions, for example when harvesting canola or hemp, during which relatively tall stubble is left behind in the field compared to wheat or other shorter stubble crops. In such long stubble conditions, wider drop pans have a greater likelihood of tipping over as they fall to the ground due to interference by the tall stubble. The top width of the smaller drop pan at the open top end thereof is preferably less than eight inches, and less than six inches in some embodiments. Among select embodiments, the top width may be between three and five inches, and approximately four inches in one particular embodiment. This reduced width falls more easily between adjacent stalks of tall stubble, thus reducing the likelihood of tipping, and thereby preventing loss of the collected sample.

Figure 6:
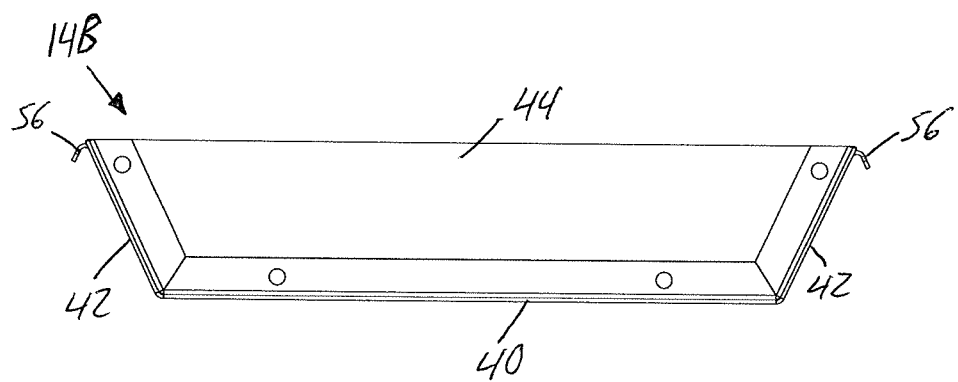
FIG. 6 is an end view of the larger drop pan of the drop pan system of FIG. 1.
Figure 7:
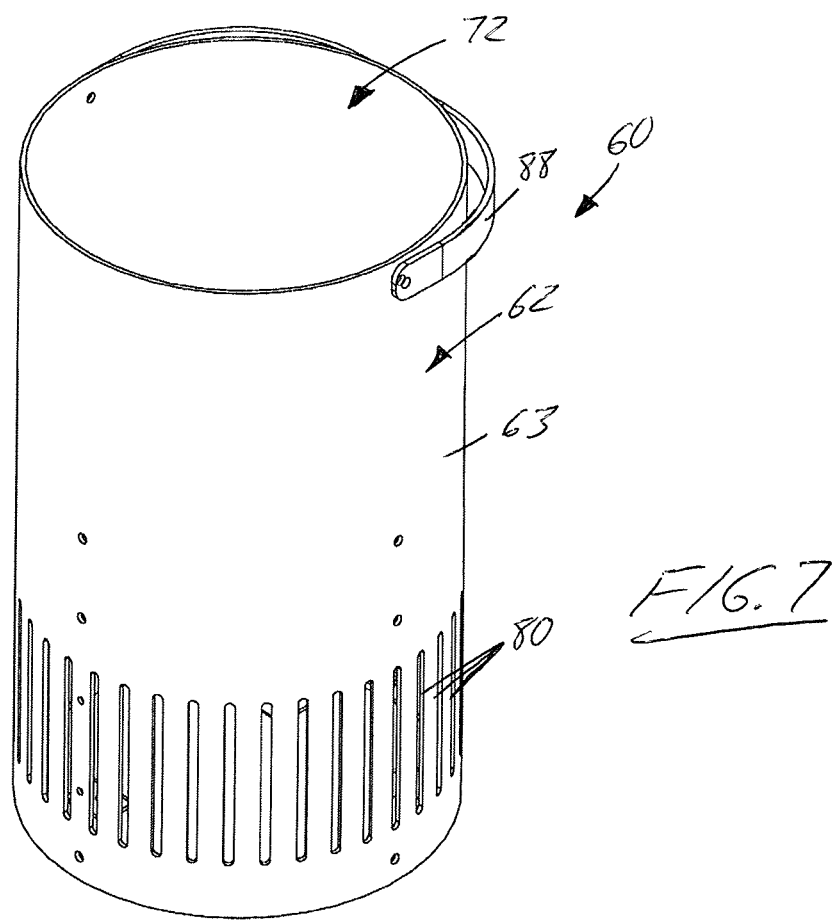
FIG. 7 is a perspective view of a grain loss sample separator of the present invention.
Figure 8:
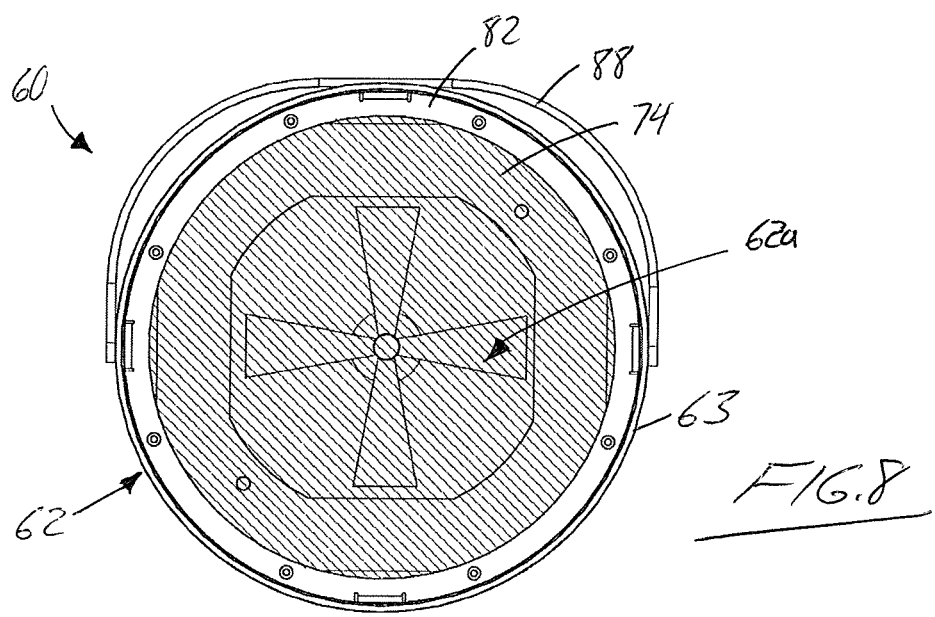
FIG. 8 is an overhead plan view of the grain loss sample separator of FIG. 7.
Figure 9:
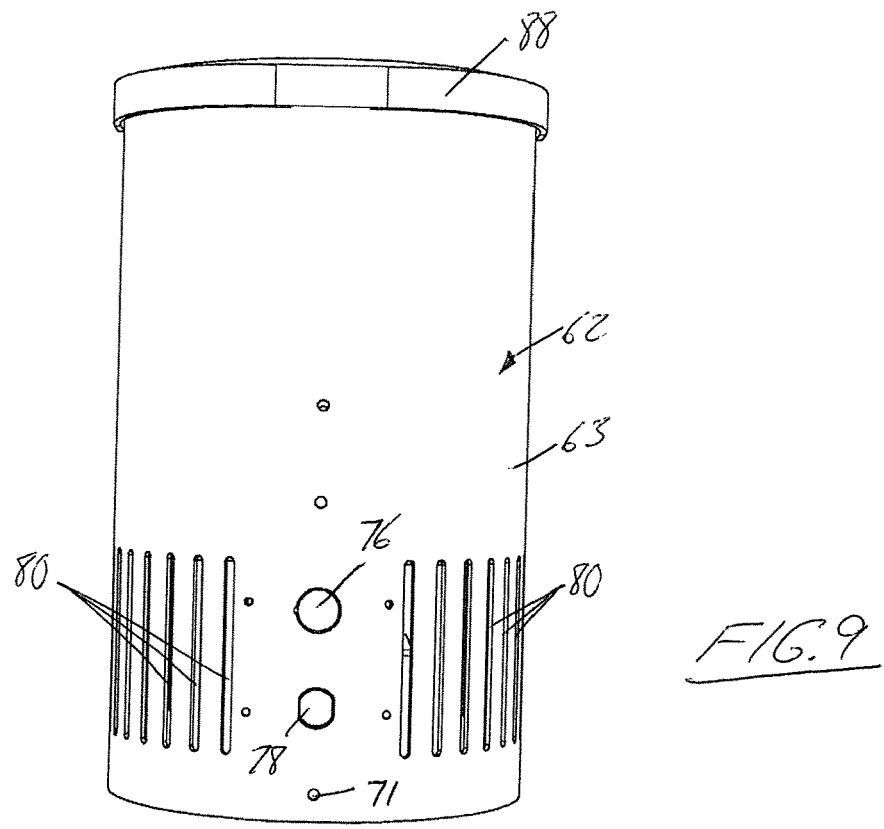
FIG. 9 is an elevational view of the grain loss sample separator of FIG. 7.

As best shown in FIG. 6, to help resist tipping, the larger drop pan 14B has out-turned wings 56 extending outwardly therefrom in downwardly and outwardly sloping relation from the top ends of the front and rear walls 42 of the pan. As shown, these wings 54 may be formed by integrally bent upper portions of the front and rear walls. As can be seen in FIGS. 1 and 2, the wings 56 preferably span a full or near entirety of the front and rear walls in the longitudinal direction of the pan. These wings help stabilize the wider pan atop or in the stubble to help reduce the chance of tipping.

To mount the support housing 12 to the undercarriage of a combine harvester, for example to the underside 100a of an axle housing 100 of the combine harvester's rear wheels 102 thereof as shown in FIG. 5, a magnetic mounting arrangement features a pair of permanent magnets 52 situated above top wall 16 of the housing in spaced elevation therefrom atop a pair of risers 54. The use of permanent magnets allows tool free mounting of the support housing to any combine harvester without any modifications thereto, and without the energy consumption associated with electromagnet retention of the housing. The use of electro-permanent magnets for the magnetic retention of the drop pan also reduces energy consumption by energizing the coils of the electro-permanent magnets only momentarily to switch from the holding state to the release state, and only in response to the command signal from the remote control when the operator wishes the release the drop pan from the moving combine harvester. Also, by using the support housing to indirectly carry the drop pan on the combine harvester, the required strength of the electro-permanent magnets is reduced, as the weight of the power supply, control circuit and electro-permanent magnets is borne by the permanent magnets 52 that hold the housing to the combine harvester, not by the electro-permanent magnets.

With the reduced power requirements of the system, the relatively small power supply, preferably consisting of only a singular battery, has a lesser width and depth than the smaller drop pan, and is placed in the middle area of the drop pan between the alignment brackets 46 in a similarly narrow enclosure 24 so that the enclosure the power supply contained therein fit within the footprint of either selected one of the drop pans when nested within the support housing. This helps keep the overall size of the support housing to a minimum by avoiding the need to extend the length or width of the support housing notably beyond the pan length or width in order to accommodate space for a larger battery or larger group of batteries that would have to be placed outside the footprint occupied by either drop pan. Additionally, with the drop pan, or at least the open top end thereof, situated within the interior space of the support housing, the top end of the drop pan is fully shielded by the support housing to prevent inadvertent admission of material into the drop pan before being dropped to the ground in response to the command signal from the wireless remote control.

While the forgoing embodiments are described primary in the context of testing the performance of a combine harvester, the same system be used on other conveyed machines or implements, whether self-conveyed or towed, to collect samples of material being discharged therefrom to the underlying ground surface over which the machine or implement is conveyed. For example, the system may be used to collect discharge samples from lime and compost spreaders to enable assessment and calibration of the machine's operational characteristics.

FIGS. 7 through 10 illustrate a separator unit 60 operable for separating grain kernels from straw and chaff in a grain loss sample collected from a drop pan, whether from the above described drop pan system of the present invention, or another known drop pan system, for example of the types described in the forgoing background. The separator features a container 62 having a cylindrically shaped peripheral wall 63 standing upright from a flat circular floor 64 of the container around a full perimeter thereof to delimit an interior space of the container 62 above the floor 64 and within the confines of the peripheral wall 63. Within the interior space of the container, a rechargeable battery 66 is mounted atop the floor 64 and held in a static position thereon by a battery hold-down 68 that resides in embracing relation over the battery and is fastened to the container floor 64. A charging cable 70 reaches outward from the battery 66 to a charging port 71 in the peripheral wall 63 of the container to enable recharging of the battery 66 by connection to an external charger (not shown). The charging cable may incorporate suitable fuse protection between the battery and charging port.

The container features an open top end 72 through which the grain loss sample from the drop tray can be poured into the container. Within the interior space of the container at a spaced elevation below the open top end 72, a mesh screen 74 divides the interior space of the container into an upper sample-receiving compartment 62a situated above the screen for receiving the grain sample, and a lower component-housing compartment 62b situated below the screen for housing operational components of the separator, including the aforementioned rechargeable power supply. A variable speed fan 76 forms another operational component of the separator unit, specifically a variable speed air moving device for blowing air upwardly through the mesh screen 74 into the upper sample-receiving compartment 62a, and onward through the open top end 72 of the container. The fan housing 78 is thus mounted below the mesh screen 74 and above the rechargeable battery 66, with the airflow outlet 78a of the fan housing 78 facing upwardly toward the open end 72 of the container.

At the lower component-housing compartment 62b of the container 62, the peripheral wall 63 has a series of air intake openings 80 situated therein at regularly spaced intervals therearound to provide a source of ambient intake air to the variable speed fan 76 from outside the container 62. As shown, these air intake openings may be in form of elongated slots lying axially of the container 62 to reach upwardly toward the fan from near the container floor 64. The upper portion of the peripheral wall 63 surrounding the upper sample-receiving compartment 62a is of solid unperforated construction. This forms a solid shroud that surrounds this upper compartment 62a and stands upright from the mesh screen 74 around the full circumference thereof so that all upward airflow from the fan 76 through the mesh screen 74 can only exit container through the open top end thereof 72, thus lifting the freed chaff upwardly therethrough to exit the container 62.

An on/off control 76 and a speed selection control 78 are mounted to the peripheral wall 63 of the container at the lower component-housing compartment 62b thereof and accessible at the exterior of the peripheral wall 63 to receive selective control input from a user concerning operation of the fan 76. For such purposes, these controls 76, 78 are thus wired in a control circuit with the rechargeable battery 66 and the variable speed fan 76 to control operation thereof. The on/off control 76, for example a push button or toggle switch, is operable to selectively activate and deactivate the fan by making and breaking an electrical connection in the control circuit between the fan and the power supply, while the speed selection control 78, for example featuring a rotational knob or dial, is operable to vary the rotational speed of the fan blades and thereby control the the rate of airflow forced upwardly thereby through the mesh screen, for example by adjusting an applied voltage level to the fan or adjusting the pulse width of a pulse wave modulation (PWM) signal from the battery to the fan. Such fan speed control techniques are well known and easily implemented using commercially available fan speed controllers, and thus are not described in further detail herein. Since known commercially available components can be used for the on/off and speed controls, they are illustrated only schematically and without detail.

As an alternative to an electronic speed controller of a variable speed fan, the airflow control mechanism for changing the airflow rate through the mesh screen may instead take the form of a mechanical device, for example an airflow restrictor movable into different positions of varying alignment with the air intake openings 80 of the container to control the admission of ambient air into the container, thus controlling the supply of intake air to the fan. This restrictor may take the form of a curved plate situated internally or externally of the container and movable into and out of a position partially obstructing the air intake openings in order to reduce the flow of intake air into the container during operation of the fan, thereby reducing the forced air flow rate through the mesh screen. In one embodiment, the restrictor has control openings therein that are laid out in similar or matching pattern to the air intake openings 80, whereby the restrictor is movable around the central longitudinal axis of the container between an open position aligning the control openings with the air intake openings 80 to leave the airflow openings completely unobstructed for maximum intake airflow, and a partially closed position placing the control openings in overlappingly offset relation to the intake openings 80 to partially obstruct the air intake openings 80 and thereby reduce airflow into the container and through the mesh screen.

The variable speed operability of unit provides improved flexibility over the prior art, as the ability to control the operating speed of the air moving device improves compatibility with a wider variety of crops. For crops whose grain kernels are of lesser weight and/or greater surface area, a lower speed setting of the fan is selected to ensure that the grain kernels are not blown upwardly off the screen and through the open top end of the container with the chaff. Crops whose grain kernels are of greater weight and/or lesser surface area can be separated using a higher fan speed to ensure thorough separation with reduced risk of the grain kernels being discharged with the separated chaff being blown out through the open top end of the separator. Such differences in weigh concentration can be due to different crop types, different moisture levels within the same crop type, or other crop characteristics or attributes.

Figure 10:
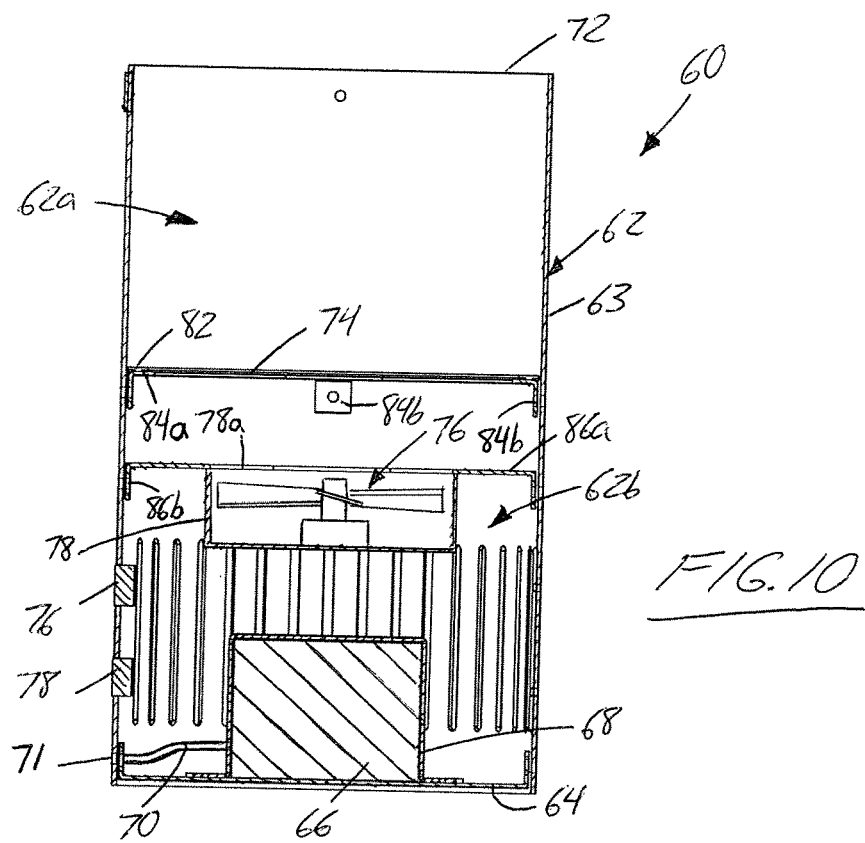
FIG. 10 is a cross-sectional view of the grain loss sample separator of FIG. 8 as viewed along line B-B thereof.

As shown in the cross-sectional view of FIG. 10, the mesh screen 74 may be stretched across the central opening of a peripheral rim 82, which in turn is fastened atop a screen support rim 84a having downturned mounting tabs 84b fastened to the inside of the container's peripheral wall 63 at spaced positions therearound. Likewise, the fan housing 78 may be attached to the underside of a fan support rim 86a having downturned mounting tabs 86b fastened to the inside of the container's peripheral wall 63 at spaced positions therearound.

As also shown in the drawings, the separator unit 60 may feature a bail handle 88 having its opposite ends pivotally pinned to the peripheral wall 63 of the container 62 at diametrically opposite points near the open top end 72 thereof for selective pivoting of the handle between a stowed position suspended at the side of the container, as shown in the drawings, and a deployed working position spanning diametrically across the open top end of the container at a spaced elevation thereabove. The container is thus conveniently and comfortably carried in a bucket-like fashion with the container freely swinging from the manually gripped handle in a generally upright position thereunder. While the illustrated embodiment features a cylindrical container of circular cross-section about its longitudinal axis, the cross-sectional shape of the container may be varied without departure from the present invention, and may, for example, be square in cross-section.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A drop pan system for collecting a discharge sample from a conveyed machine or implement that discharges material to a ground surface over which the machine or implement travels, said system comprising:
    a support housing attachable to the machine or implement;
    a drop pan receivable in a nested position at least partially within said housing;
    wherein the support housing comprises a top wall and a plurality of peripheral walls depending from said top wall around a perimeter thereof to delimit an interior space of the support housing in which the drop pan is nestable through an open bottom of said support housing;
    a magnetic hold/release mechanism comprising at least one electro-permanent magnet responsive to selective energization to switch from a holding state emitting an external magnetic field for holding the drop pan in the nested position, to a release state cancelling said external magnetic field to thereby release the drop pan from the housing;
    a power supply supported on the housing, wherein the power supply is positioned within an enclosure, which doubles as a support for one or more components of the magnetic hold/release mechanism, wherein the enclosure comprises a bottom wall residing in spaced relation from the top wall of the support housing, the power supply resides between said top wall of the support housing and said bottom wall of the enclosure, and the at least one electro-permanent magnet of the magnetic hold/release mechanism protrudes externally from said bottom wall of the enclosure and downwardly away from the top wall of the support housing;
    a control circuit between the power supply and the magnetic hold/release mechanism operable to make and break an electrically conductive connection therebetween; and
    a remote control transmitter communicable with a receiver in the control circuit to effect switching of said control circuit from an open state in which the magnetic hold/release mechanism is de-energized, to a closed state in which the magnetic hold/release mechanism is energized.

2. The drop pan system of claim 1 wherein the power supply is positioned to reside within a footprint of the drop pan's nested position inside the housing.

3. The drop pan system of claim 1 wherein said enclosure runs longitudinally of the housing and the magnetic hold/release mechanism comprises two electro-permanent magnets disposed at spaced apart positions adjacent opposing ends of said enclosure.

4. A drop pan system for collecting a discharge sample from a conveyed machine or implement that discharges material to a ground surface over which the machine or implement travels, said system comprising:
    a housing attachable to the machine or implement;
    a set of differently sized drop pans comprising a small drop pan and a large drop pan, wherein, each of the small drop pan and the large drop pan selectively received in a nested position at least partially within the housing;
    a hold/release mechanism operable between a holding state in which the selectively received one of the small drop pan and the large drop pan is held in the nested position and a release state in which the selectively received one of the small drop pan and the large drop pan is released from the housing; and
    alignment guides for selectively aligning said set of differently sized drop pans relative to the housing and the hold/release mechanism when the selectively received one of the small drop pan and the large drop pan is in the nested position;
    wherein said alignment guides comprise an inner set of guides for receiving walls of the small drop pan and an outer set of guides for receiving walls of the large drop pan.

5. The drop pan system of claim 4, wherein each of the inner set of guides and the outer set of guides comprises convergently sloped guide surfaces that converge in a downward direction toward an open bottom of the housing, and wherein each of the small drop pan and the large drop pan comprises a pair of convergently sloped walls that converge in the downward direction toward a closed bottom of the respective small drop pan and the large drop pan.

6. The drop pan system of claim 4 wherein the outer set of guides comprise guide lobes situated on opposite sides of said inner set of guides.

7. The drop pan system of claim 6, further comprising at least one guide bracket defining both an inner guide for the small drop pan and an outer guide for the large drop pan, said outer guide comprising a pair of outer guide lobes situated on opposite sides of said inner guide and distinguished therefrom by gaps in said guide bracket.

8. The drop pan system of claim 7 wherein said at least one guide bracket comprises two guide brackets residing respectively adjacent opposite ends of the housing.

9. The drop pan of claim 4, wherein at least one of the alignment guides is positioned to cap off an end of an enclosure that houses one or more components of the hold/release mechanism.

10. The drop pan system of claim 4, wherein the small drop pan has a width of less than eight inches.

11. The drop pan system of claim 4, wherein the small drop pan has a width of less than six inches.

12. The drop pan system of claim 4 wherein the small drop pan has a width of between three and five inches, inclusive.

13. A drop pan system for collecting a discharge sample from a conveyed machine or implement that discharges material to a ground surface over which the machine or implement travels, said system comprising:
   a support housing attachable to the machine or implement;
   a drop pan receivable in a nested position at least partially within said housing;
   a magnetic hold/release mechanism comprising at least one electro-permanent magnet responsive to selective energization to switch from a holding state emitting an external magnetic field for holding the drop pan in the nested position, to a release state cancelling said external magnetic field to thereby release the drop pan from the housing;
   a power supply supported on the housing, wherein the power supply is positioned within an enclosure, which doubles as a support for one or more components of the magnetic hold/release mechanism, wherein said enclosure runs longitudinally of the housing and the magnetic hold/release mechanism comprises two electro-permanent magnets disposed at spaced apart positions adjacent opposing ends of said enclosure;
   a control circuit between the power supply and the magnetic hold/release mechanism operable to make and break an electrically conductive connection therebetween; and
   a remote control transmitter communicable with a receiver in the control circuit to effect switching of said control circuit from an open state in which the magnetic hold/release mechanism is de-energized, to a closed state in which the magnetic hold/release mechanism is energized.

14. A drop pan system for collecting a sample of material discharged from a harvesting machine as the harvesting machine travels through a field in a forward direction of travel during harvesting operations while harvesting a crop, said drop pan system comprising:
   a housing including a top wall and peripheral sidewalls which collectively define an interior housing space having an open bottom end, a lower end of the peripheral sidewalls defining a lower housing plane, the top wall of the housing operably attached to a portion of the harvesting machine above a ground surface such that the open bottom end of the housing is oriented toward the ground surface;
   a drop pan having a bottom floor and perimeter sidewalls which collectively define an interior pan space having a closed bottom end and an open top end, the open top end of the drop pan sized to be received within the open bottom end of the housing, an upper end of the perimeter sidewalls defining a drop pan upper plane;
   an electric power source;
   an electro-permanent magnet disposed within the interior housing space of the housing;
   a control circuit coupled to the electric power source and the electro-permanent magnet, the control circuit including a remotely controllable switch having a default open state and an actuated closed state, whereby, when the remotely controllable switch is in the default open state, the electro-permanent magnet is electrically isolated from the electric power source, and when the remotely controllable switch is in the actuated closed state, the electro-permanent magnet is electrically coupled to the electric power source;
   wherein, when the remotely controllable switch is in the default open state, the electro-permanent magnet is in a default holding state drawing no electric power from the electric power source and the drop pan is magnetically coupled to the housing by the electro-permanent magnet with the open top end of the drop pan received in the open bottom end of the housing with the drop pan upper plane above the lower housing plane; and
   wherein, when the remotely controllable switch is in the actuated closed state, the electro-permanent magnet is in an actuated release state drawing electric power from the electric power source, and the drop pan is not magnetically coupled to the housing by the electro-permanent magnet such that the drop pan falls toward the ground surface.

15. The drop pan system of claim 14, further comprising:
   a permanent magnet magnetically attaching the top wall of the housing to the portion of the harvesting machine above the ground surface.

16. The drop pan system of claim 14, wherein the electric power source is disposed within the interior housing space of the housing.

17. The drop pan system of claim 14, wherein the drop pan is any one of: (i) a structure made entirely of ferromagnetic material; (ii) a structure which includes portions made of ferromagnetic material in alignment with the electro-permanent magnet when the drop pan is magnetically coupled to the housing; (iii) a structure that is made substantially of non-ferromagnetic material, but having a ferromagnetic part secured to a top side of the bottom floor that aligns with the electro-permanent magnet when the drop pan is magnetically coupled to the housing.

18. A method of collecting a sample of crop material discharged by a harvesting machine while harvesting a crop, the method comprising:
   operably mounting a housing to a portion of the harvesting machine above a ground surface, the housing including a top wall and peripheral sidewalls which collectively define an interior housing space having an open bottom end is oriented toward the ground surface, a lower end of the peripheral sidewalls defining a lower housing plane;

magnetically coupling a drop pan to the housing, the drop pan including a bottom floor and perimeter sidewalls which collectively define an interior pan space having a closed bottom end and an open top end, an upper end of the perimeter sidewalls defining a drop pan upper plane, the open top end of the drop pan received in the open bottom end of the housing with the drop pan upper plane above the lower housing plane;

whereby the drop pan is magnetically coupled to the housing via an electro-permanent magnet disposed within the interior housing space of the housing, a control circuit is coupled to the electro-permanent magnet and an electric power source, the control circuit including a remotely controllable switch having a default open state and an actuated closed state, wherein, when the remotely controllable switch is in the default open state, the electro-permanent magnet is electrically isolated from the electric power source whereby the electro-permanent magnet is in a default holding state in which the electro-permanent magnet draws no electric power from the electric power source, and wherein, when the remotely controllable switch is in the actuated closed state, the electro-permanent magnet is electrically coupled to the electric power source whereby the electro-permanent magnet is in an actuated release state in which the electro-permanent magnet draws electric power from the electric power source;

as the harvesting machine travels through a field in a forward direction of travel harvesting the crop, actuating the remotely controllable switch to change from the default open state to the actuated closed state such that the electro-permanent magnet changes from the default holding state to the actuated release state thereby causing the drop pan to drop from the housing onto the ground surface with the open top end oriented upward away from the ground surface;

as the harvesting machine continues to advance through the field in the forward direction of travel, the open top end of the released drop pan on the ground surface capturing a sample of the crop material discharged by the advancing harvesting machine.

19. The method of claim 18, wherein the step of operably mounting the housing to the portion of the harvesting machine above the ground surface includes magnetically attaching the top wall of the housing to the portion of the harvesting machine using permanent magnets.

20. The method of claim 18, wherein the electric power source is disposed within the interior housing space of the housing.

21. The method of claim 18, wherein the drop pan is any one of: (i) a structure made entirely of ferromagnetic material; (ii) a structure which includes portions made of ferromagnetic material in alignment with the electro-permanent magnet when the drop pan is magnetically coupled to the housing; (iii) a structure that is made substantially of non-ferromagnetic material, but having a ferromagnetic part secured to a top side of the bottom floor that aligns with the electro-permanent magnet when the drop pan is magnetically coupled to the housing.

22. The method of claim 18, wherein the sample of crop material captured within the drop pan includes grain kernels and crop debris, the method further comprising:

separating the grain kernels from the crop debris.

23. The method of claim 22, wherein the step of separating the grain kernels from the crop debris includes transferring the sample of crop material from the drop pan to a container and directing an air flow across the sample of crop material within the container, the air flow separating the crop debris from the grain kernels.

24. The method of claim 23, wherein the container includes:

a peripheral wall defining an interior space with an open upper end;

a mesh screen disposed within the interior space a distance below the open upper end, the mesh screen dividing the interior space of the container into an upper sample-receiving compartment and a lower compartment, the upper sample-receiving compartment receiving the sample of crop material transferred from the drop pan, the lower compartment housing a fan, the fan generating the air flow upwardly through the mesh screen across the sample of crop material within the upper-sample receiving compartment, the generated air flow being sufficient to blow the crop debris out of the upper-sample receiving compartment through the open upper end without blowing the grain kernels out the open upper end, such that the grain kernels remain within the interior space.

25. The method of claim 24, wherein the container further includes:

a battery power source disposed within the lower compartment for powering the fan.

26. The method of claim 25, wherein the fan is a variable speed fan.

* * * * *